United States Patent
Wang

(10) Patent No.: US 11,991,595 B2
(45) Date of Patent: *May 21, 2024

(54) MOVEMENT TRACK RECORDING METHOD AND APPARATUS

(71) Applicant: Huawei Technologies Co., Ltd., Shenzhen (CN)

(72) Inventor: Tongbo Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 77 days.

This patent is subject to a terminal disclaimer.

(21) Appl. No.: 17/743,987

(22) Filed: May 13, 2022

(65) Prior Publication Data
US 2022/0279315 A1    Sep. 1, 2022

Related U.S. Application Data

(63) Continuation of application No. 16/074,677, filed as application No. PCT/CN2016/073153 on Feb. 2, 2016, now Pat. No. 11,363,412.

(51) Int. Cl.
H04W 4/029    (2018.01)
H04W 4/02     (2018.01)
H04W 52/02    (2009.01)
H04W 64/00    (2009.01)

(52) U.S. Cl.
CPC .......... *H04W 4/029* (2018.02); *H04W 4/027* (2013.01); *H04W 52/0254* (2013.01); *H04W 64/003* (2013.01); *Y02D 30/70* (2020.08)

(58) Field of Classification Search
CPC ... H04W 4/029; H04W 64/00; H04W 64/003; H04W 4/027; H04W 4/021; H04W 52/0254; H04W 52/0258; Y02D 70/142; Y02D 70/00
See application file for complete search history.

(56) References Cited

U.S. PATENT DOCUMENTS 8,036,679 B1 * 10/2011 Barbeau ............... H04W 4/02
                                                455/414.1
8,634,881 B2    1/2014 Alpert et al.
2013/0165147 A1  6/2013 Alpert et al.
(Continued)

FOREIGN PATENT DOCUMENTS

CN    101938831 A    1/2011
CN    202522704 U    11/2012
(Continued)

OTHER PUBLICATIONS

Foreign Communication From a Counterpart Application, Chinese Application No. 201680004624.8, Chinese Office Action dated Jun. 4, 2018, 7 pages.
(Continued)

*Primary Examiner* — Margaret G Mastrodonato

(57) ABSTRACT

A movement track recording method and an apparatus used for movement track recording, and relate to the communications field, where power consumption of a terminal can be reduced without affecting track recording precision. The method includes determining a positioning trigger condition according to positioning precision, positioning a terminal when the positioning trigger condition is met, and recording a location of the terminal.

18 Claims, 6 Drawing Sheets

---

Determine a positioning trigger condition according to positioning precision — 11

Position a terminal device when the positioning trigger condition is met, and record a location of the terminal device — 12

(56) References Cited

U.S. PATENT DOCUMENTS

| | | |
|---|---|---|
| 2013/0245790 A1 | 9/2013 | Sakakihara |
| 2013/0295969 A1* | 11/2013 | Sheshadri ............... G01S 19/52 455/456.6 |
| 2015/0141045 A1 | 5/2015 | Qiu et al. |

FOREIGN PATENT DOCUMENTS

| | | | |
|---|---|---|---|
| CN | 302466268 S | 6/2013 | |
| CN | 104066163 A | 9/2014 | |
| CN | 104678420 A | 6/2015 | |
| WO | WO-2013100225 A1 * | 7/2013 | ........... G01S 5/0257 |
| WO | 2015006819 A1 | 1/2015 | |

OTHER PUBLICATIONS

Foreign Communication From a Counterpart Application, European Application No. 16888647.1, Extended European Search Report dated Nov. 22, 2018, 8 pages.
Machine Translation and Abstract of Chinese Publication No. CN101938831, dated Jan. 5, 2011, 12 pages.
Machine Translation and Abstract of Chinese Publication No. CN104066163, dated Sep. 24, 2014, 25 pages.
Machine Translation and Abstract of Chinese Publication No. CN104678420, dated Jun. 3, 2015, 16 pages.
Machine Translation and Abstract of Chinese Publication No. CN202522704, dated Nov. 7, 2012, 6 pages.
Foreign Communication From a Counterpart Application, PCT Application No. PCT/CN2016/073153, English Translation of International Search Report dated Oct. 21, 2016, 3 pages.
Foreign Communication From a Counterpart Application, PCT Application No. PCT/CN2016/073153, English Translation of Written Opinion dated Oct. 21, 2016, 5 pages.

* cited by examiner

MOVEMENT TRACK RECORDING METHOD AND APPARATUS

CROSS-REFERENCE TO RELATED APPLICATIONS

This application is a continuation of U.S. patent application Ser. No. 16/074,677, filed on Aug. 1, 2018, which is a National Stage of International Patent Application No. PCT/CN2016/073153 filed on Feb. 2, 2016. The entire contents of both of the aforementioned applications are hereby incorporated by reference in their entireties.

TECHNICAL FIELD

The present invention relates to the communications field, and in particular, to a movement track recording method and an apparatus.

BACKGROUND

Currently, with progress of science and technology and an increasing demand of people for a positioning function, the positioning function has become a necessary function of an intelligent terminal. More users record movement tracks based on the positioning function. A movement track recording function may be used to: record a movement track of a user, and display the movement track on a map for the user, so as to provide good man-machine interaction.

For a related technology, in a movement track recording process, a terminal obtains location information of the terminal once every fixed period, and forms a movement track depending on location information obtained for many times. However, in this movement track recording manner, in order not to affect track recording precision, a relatively small fixed period is usually set. Consequently, power consumption of the terminal is increased, and a battery life of the terminal is affected.

SUMMARY

To reduce power consumption of a terminal device without affecting track recording precision, the present invention provides a movement track recording method and an apparatus.

According to a first aspect, a movement track recording method executed by a terminal device is provided. The method includes: determining a positioning trigger condition according to positioning precision, where the positioning precision is precision that needs to be reached when a movement track of the terminal device is recorded, and the positioning trigger condition is used to trigger terminal device positioning; and positioning the terminal device when the positioning trigger condition is met, and recording a location of the terminal device.

In this embodiment of the present invention, the positioning trigger condition is determined based on the positioning precision, so that track recording precision can be ensured. In addition, the positioning trigger condition for triggering terminal device positioning is not fixed but is dynamically adjustable, so that it can be avoided that power consumption of the terminal device is increased because the track is recorded by using a relatively small fixed period. In this way, the power consumption of the terminal device is reduced without affecting the track recording precision.

With reference to the first aspect, in a first possible implementation, the present invention is applied to an outdoor moving scenario; and correspondingly, the determining a positioning trigger condition according to positioning precision may include: determining the positioning trigger condition according to the positioning precision when the terminal device is located in an outdoor moving scenario.

In the outdoor moving scenario, the terminal device has a relatively large movement track, and a movement track is more intuitively recorded. Therefore, movement track recording is preferably used in the outdoor moving scenario. Certainly, within the scope of the present invention, the movement track recording may also be used in a scenario such as an indoor moving scenario.

With reference to the first possible implementation of the first aspect, in a second possible implementation, before the determining a positioning trigger condition according to positioning precision, the method may further include: first determining a movement status and a location environment of the terminal device, where the movement status includes a still state and a moving state, and the location environment includes an indoor environment and an outdoor environment. In this embodiment of the present invention, the movement status and the location environment of the terminal device are first determined before the positioning trigger condition is determined. In this way, the terminal device can be positioned in different positioning manners according to different movement statuses and location environments. For example, GPS positioning is used for outdoor positioning, and WiFi positioning or cell identity positioning is used for indoor positioning.

With reference to any one of the foregoing possible implementations of the first aspect, in a third possible implementation, the positioning trigger condition is a positioning time interval, and the positioning time interval is dynamically adjustable. In an existing movement track recording manner, the positioning time interval is fixed and usually fixed at one second, and consequently, relatively large power consumption is caused. However, in this embodiment of the present invention, the positioning time interval is dynamically adjustable, so that the positioning time interval is dynamically adjustable according to the positioning precision, so as to reduce the power consumption of the terminal device.

With reference to the third possible implementation of the first aspect, in a fourth possible implementation, when the positioning trigger condition is the positioning time interval, the determining a positioning trigger condition according to positioning precision may be specifically: when the terminal device moves, determining, according to the positioning precision and a current moving speed of the terminal device, a positioning time interval for a next time of positioning; and correspondingly, the positioning the terminal device when the positioning trigger condition is met, and recording location information of the terminal device may be specifically: starting timing, positioning the terminal device when the timing reaches the positioning time interval for the next time of positioning, and recording a current location of the terminal device.

Both the positioning precision and the current moving speed are considered when the positioning time interval is being determined, so that the power consumption of the terminal device can be reduced while ensuring the positioning precision. When the current moving speed of the terminal device is high, a relatively small positioning time interval may be set for the next time of positioning. However, when the current moving speed of the terminal device becomes lower, the next positioning time interval may be increased for the next time of positioning. That is, a higher speed of the terminal device indicates a smaller positioning time interval for the next time of positioning, and a lower speed of the terminal device indicates a larger positioning time interval. In this way, the positioning time interval is dynamically adjusted, so as to reduce the power consumption of the terminal device while ensuring the positioning precision.

With reference to the fourth possible implementation of the first aspect, in a fifth possible implementation, the determining, according to the positioning precision and a current moving speed of the terminal device, a positioning time interval for a next time of positioning includes:

$T_i = D/V_i$, where i≥1, i is a positive integer, $T_i$ is a positioning time interval between an $i^{th}$ time of positioning and an $(i+1)^{th}$ time of positioning, D is the positioning precision, and $V_i$ is a moving speed of the terminal device during the $i^{th}$ time of positioning.

With reference to the fifth possible implementation of the first aspect, in a sixth possible implementation, the movement track recording method may further include: setting a time interval threshold $T_0$; and correspondingly, the determining, according to the positioning precision and a current moving speed of the terminal device, a positioning time interval for a next time of positioning may be specifically: when $T_i \leq T_0$, selecting $T_i$ as the positioning time interval between the $i^{th}$ time of positioning and the $(i+1)^{th}$ time of positioning; or when $T_i > T_0$, selecting $T_0$ as the positioning time interval between the $i^{th}$ time of positioning and the $(i+1)^{th}$ time of positioning.

In this embodiment of the present invention, a smaller one of $T_i$ and the time interval threshold $T_0$ is selected as the positioning time interval between the $i^{th}$ time of positioning and the $(i+1)^{th}$ time of positioning, so that a recording deviation caused by a relatively large time interval $T_i$ can be avoided, and a proper value of the positioning time interval can be ensured.

With reference to any one possible implementation of the first aspect, in a seventh possible implementation, the positioning trigger condition is a geo-fence boundary, and the geo-fence boundary is dynamically adjustable.

With reference to the seventh possible implementation of the first aspect, in an eighth possible implementation, when the positioning trigger condition is the geo-fence boundary, the determining a positioning trigger condition according to positioning precision may be specifically: setting, by using a current location of the terminal device as a center and using the positioning precision as a radius, a geo-fence boundary for a next time of positioning; and correspondingly, the positioning the terminal device when the positioning trigger condition is met, and recording location information of the terminal device may be specifically: positioning the terminal device once the terminal device moves to the geo-fence boundary, and recording a current location of the terminal device.

The geo-fence boundary is used as the positioning trigger condition, so that the geo-fence boundary can be dynamically set when the location of the terminal device changes, and the location of the terminal device is obtained once only when the terminal device reaches the geo-fence boundary. In this way, an accurate movement track record can be obtained, so that the location record always exists. In addition, the power consumption of the terminal device can be reduced.

With reference to any one possible implementation of the first aspect, in a ninth possible implementation, before the determining a positioning trigger condition according to positioning precision, the method may further include: recording an initial location of the terminal device, where the initial location may be used as a start point of the movement track, to instruct to start recording the movement track.

According to the movement track recording method and the apparatus that are provided in the embodiments of the present invention, the positioning trigger condition is determined based on the positioning precision, so that the track recording precision can be ensured. In addition, the positioning trigger condition for triggering terminal device positioning is not fixed but is dynamically adjustable, so that it can be avoided that the power consumption of the terminal device is increased because the track is recorded by using a relatively small fixed period. In this way, the power consumption of the terminal device is reduced without affecting the track recording precision.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

The embodiments of the present invention provide a movement track recording method, and the method may be performed by a terminal device. The terminal device may also be referred to as user equipment (User Equipment, "UE" for short), a mobile station (Mobile Station, "MS" for short), a mobile terminal (Mobile Terminal), or the like. The terminal device may communicate with one or more core networks by using a radio access network (Radio Access Network, "RAN" for short). For example, the terminal device may be a mobile phone (also referred to as a "cellular" phone), a computer with a mobile terminal, or the like. For example, the terminal device may be a portable, pocket-sized, handheld, computer built-in, or in-vehicle mobile apparatus that may exchange voice and/or data with the radio access network.

During movement track recording, geographical location information of the terminal device needs to be first obtained.

In the embodiments of the present invention, the geographical location information of the terminal may be obtained by using a GPS (Global Positioning System, Global Positioning System) positioning technology, a WiFi positioning technology, a base station positioning technology, or another positioning technology. This is not limited in the embodiments of the present invention. The GPS depends on a GPS navigation satellite to implement positioning. For the WiFi positioning, a WiFi hardware module collects information about an access point (Access Point, AP) by means of scanning, sends the information to a positioning server, and receives location information from the positioning server, so as to implement positioning. Similar to the WiFi positioning, for the base station positioning, a 2G/3G/4G hardware module sends received base station information to a positioning server, the positioning server completes positioning, and the 2G/3G/4G hardware module receives location information sent by the positioning server. Alternatively, the terminal may implement positioning by using an inertial navigation technology, that is, obtain speed information of the terminal at each moment in a moving process by using an acceleration sensor and a gyroscope of the terminal, and calculate a current location of the terminal when knowing a start moving point. Because a person skilled in the art is rather familiar with various positioning technologies for determining a terminal location, details are not described herein.

Figure 1A:
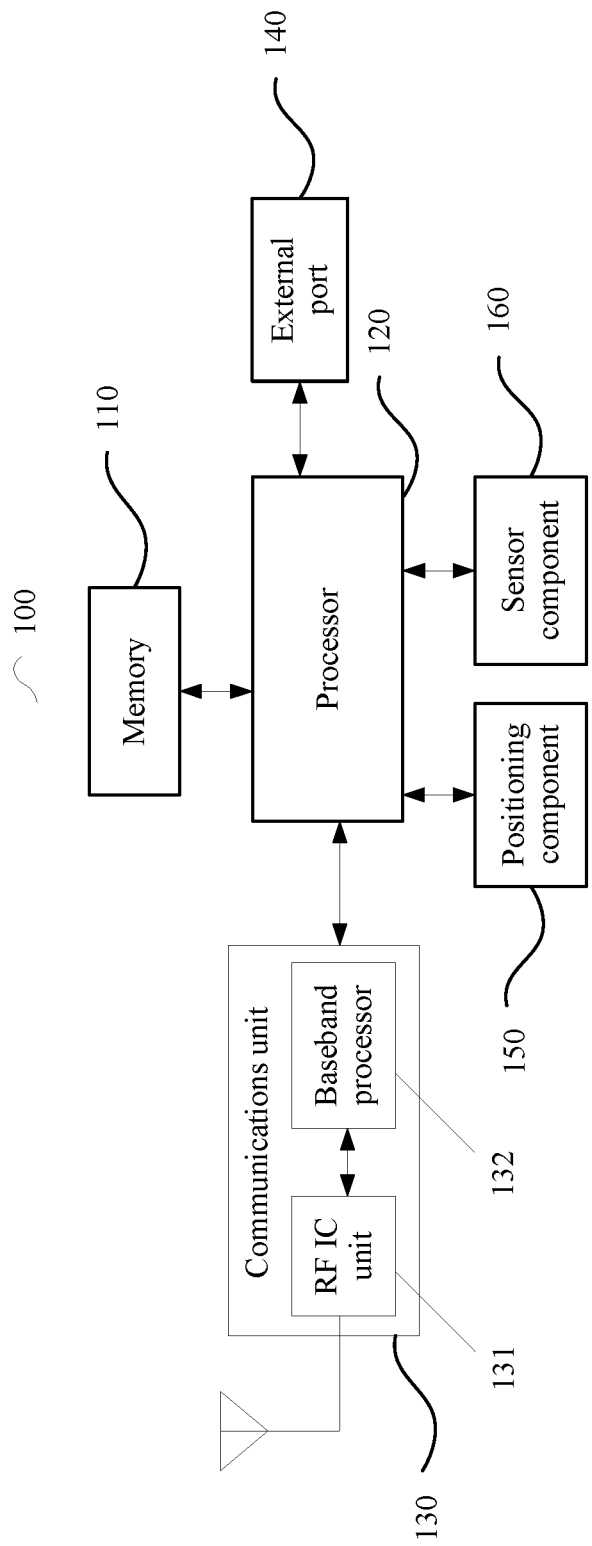
FIG. 1A is a schematic structural diagram of a terminal device according to an embodiment of the present invention.

FIG. 1A shows a terminal device according to an example embodiment of the present invention. The terminal device 100 is typically a device such as a portable terminal, a mobile phone, a mobile pad, a media player, a tablet computer, a handheld computer, or a personal digital assistant (PDA). The terminal device 100 may have a combination of two or more functions of these devices.

The terminal device 100 may include a memory 110, a processor 120, a communications unit 130, an external port 140, a positioning component 150, and a sensor component 160. Multiple memories 110 and multiple external ports 140 may be used.

The processor 120 herein may include a memory controller, a microprocessor (a central processing unit CPU), and the like. One or more processors may be configured herein to perform various operations. The communications unit 430 may include a baseband processor 432 and a radio frequency (RF) IC unit 431.

The configured elements communicate with each other by using one or more communications buses or signal cables (not shown). For example, the configured elements may be implemented by hardware such as one or more ICs, or by software that is loaded into the processor for execution, or by a combination of hardware and software.

The terminal device 100 in FIG. 1A is an example for the purpose of description, and a person skilled in the art may implement various different configurations in the appended claims within the spirit and scope of the present invention. The terminal device 100 may include more or fewer parts than those shown in the figure. For example, the terminal device 100 may not include the external port 140. Configuration of the terminal device 100 may be different from that shown in FIG. 1A.

The following describes the configured elements of the terminal device 100.

For example, the memory 110 preferably includes a random access memory, a nonvolatile memory including a flash memory, a read-only memory (ROM), an electrically erasable programmable ROM (EEPROM), a magnetic disk storage, a compact disc ROM (CD-ROM), a digital versatile disc (DVD) or another optical storage, a cassette, and/or the like. Alternatively, the memory 110 may have a combination of some or all of these recording media. Multiple memories may be equipped.

The memory 110 may store software. The software includes various types of software used to process data sending/receiving by using the RF IC unit 431 or the external port 440, various types of software used to control an inertial navigation system (INS) according to a location and satellite information of the Global Navigation Satellite System (GNSS), operating system software, application software, and the like.

The external port 140 is, for example, but is not limited to a universal serial bus (USB) port or a FireWire port. The external port 140 is configured to directly connect the terminal device 100 and another electronic device, or indirectly connect the terminal device 100 and another electronic device by using a network (such as an Ethernet, the Internet, an intranet, and a wireless LAN).

The processor executes multiple functions of the terminal device 100 by executing multiple software programs, and processes and controls voice communication and data communication. In addition to these typical functions, the processor may further execute a specific software module (an instruction set) stored in the memory 410, and execute various specific functions corresponding to the module.

In addition, the communications unit 130 may include the RF IC unit 131 and the baseband processor 132. The RF IC unit 131 sends/receives a radio wave. The RF IC unit 131 converts, into a radio wave, a baseband signal fed from the baseband processor 132, and sends the radio wave by using an antenna. The RF IC unit 131 converts a radio wave received by using an antenna, and provides a converted radio wave to the baseband processor 132. The RF IC unit 131 may include an RF transceiver, an amplifier, a tuner, an oscillator, a digital signal processor, a coder/decoder (CODEC) chip set, and a subscriber identity module (SIM) card. These components are not shown in the figure.

In addition, the RF IC unit 131 communicates with a communications network and another communications device by using a radio wave. For example, the RF IC unit 131 may communicate with a wireless network, such as the Internet, an intranet, a network, a cellular telephone network, a wireless LAN, or a wireless metropolitan area network (MAN). The RF IC unit 131 may communicate with another electronic device by means of wireless communication.

The wireless communication refers to, for example, but is not limited to a single protocol or any combination of the following protocols: Time Division Multiple Access (TDMA), Global System for Mobile Communications (GSM), Enhanced Data for GSM Environment (EDGE), Code Division Multiple Access (CDMA), Wideband Code Division Multiple Access (W-CDMA), Orthogonal Frequency Division Multiple Access (OFDMA), Bluetooth, Near Field Communication (NFC), infrared communications, Voice over Internet Protocol (VoIP), Wireless Fidelity (Wi-Fi), Wi-MAX, or a protocol for receiving/sending an email or instant message or for a short message service (SMS).

In this example embodiment, the RF IC unit 131 performs frequency conversion on an RF signal received by using an antenna (not shown), and provides a converted signal to the baseband processor 132. In addition, the RF IC unit 131 performs frequency conversion on a baseband signal that is output from the baseband processor 132, and sends a converted signal by using an antenna. For example, in a nonrestrictive example, when performing sending according to CDMA, the baseband processor 132 performs channel coding and spreading on to-be-sent data. When performing receiving, the baseband processor 132 performs despreading and channel decoding on a received signal. However, a person skilled in the art may understand that a form of a spread spectrum for sending is not limited in the claimed invention.

The positioning component 150 is configured to: position the terminal device, and provide a result to the processor. When the GPS positioning manner is used, the positioning component 150 may include a satellite information receiver, and position the terminal device by receiving a GPS satellite signal. Similarly, when the WiFi positioning manner or the base station positioning manner is used, the positioning component 150 may include hardware adaptive to the positioning manner.

The sensor component 160 detects a signal by using an inertial sensor (such as an accelerometer, a gyroscope, and an altimeter) and an additional sensor (such as a geomagnetic sensor), to obtain information about an acceleration, a speed, and a direction (sensor data for short); and provides a result to the processor 422.

Figure 1B:
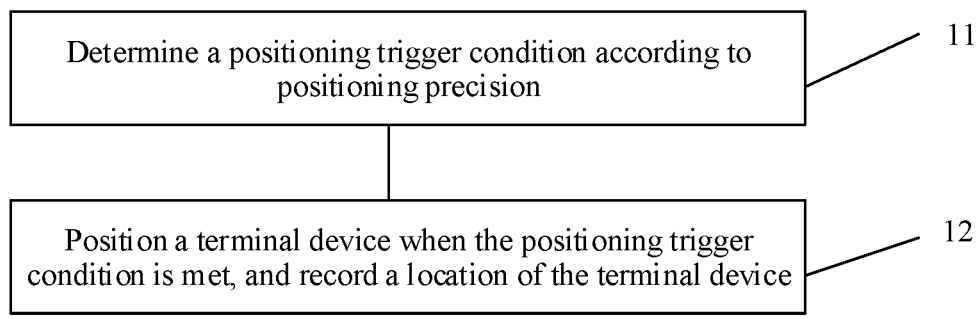
FIG. 1B is a flowchart of a movement track recording method according to an embodiment of the present invention.

FIG. 1B is a flowchart of a movement track recording method according to an embodiment of the present invention. Referring to FIG. 1B, the following describes the track recording method provided in this embodiment of the present invention. The method may include the following steps.

11. Determine a positioning trigger condition according to positioning precision.

The positioning precision is precision that needs to be reached when a movement track of a terminal device is recorded. A value of the positioning precision may be set by a vendor of the terminal device and may be selected by a user of the terminal device; or may be directly set by a vendor of the terminal device but cannot be selected by a user of the terminal device. For example, the positioning precision may be set to 10 meters, 20 meters, or the like.

The positioning trigger condition is used to trigger terminal device positioning. In this embodiment of the present invention, the positioning trigger condition may be a positioning time interval, or may be a geo-fence boundary or the like.

12. Position a terminal device when the positioning trigger condition is met, and record a location of the terminal device.

Before step 11, an initial location of the terminal device may be first determined, and the initial location of the terminal device may be recorded. In this way, the terminal device can be subsequently positioned according to the positioning trigger condition, and subsequent locations of the terminal device are recorded to form a movement track for the user to view and use.

According to the movement track recording method provided in this embodiment of the present invention, the terminal device is positioned when the positioning trigger condition is met, and the location of the terminal device is recorded. The positioning precision is considered when the positioning trigger condition is being determined, so that precision in recording the movement track of the terminal device cannot be affected. In addition, the variable positioning trigger condition instead of a relatively small fixed period is used as the terminal device positioning condition, so that power consumption of the terminal device can be reduced.

In this embodiment of the present invention, before the determining a positioning trigger condition according to positioning precision, a movement status and a location environment of the terminal device may be further determined. The movement status includes a still state and a moving state, and the location environment includes an indoor environment and an outdoor environment. In this way, in this embodiment of the present invention, there may be four specific application scenarios: an outdoor moving scenario, an indoor moving scenario, an outdoor still scenario, and an indoor still scenario.

In this embodiment of the present invention, the still state or the moving state may be determined by using a motion sensor and/or in various positioning manners (such as the GPS). The motion sensor may include at least one of the following: an accelerometer, a gyroscope, a magnetometer, a pressure sensor, a temperature sensor, a microphone, or a heart rate detector. For example, when the location of the terminal device significantly changes, a previous location and a current location are directly compared by means of positioning, to determine whether the terminal device moves. When the location of the terminal device slightly changes, data from the motion sensor may be collected, and movement status information is calculated according to each piece of collected data. For example, if an accelerometer standard deviation is higher than a threshold A, it is assumed that a user is running. Otherwise, if an accelerometer standard deviation is higher than a threshold B and lower than a threshold A, it is assumed that a user is walking; otherwise, it is assumed that a user is standing or sitting. In this way, the action types of the user may be distinguished from each other.

In this embodiment of the present invention, the location environment of the terminal device may be determined in the following manner: determining a current location environment of the terminal device according to a quantity of GPS satellites and/or a received signal strength indicator (RSSI) of a WiFi access point. For example, when the quantity of visible GPS satellites is not less than 4, it may be determined that the terminal device is located in an outdoor environment; or when the quantity of GPS satellites is less than 4, it is determined that the terminal device is located in an indoor environment; or when the quantity of GPS satellites is less than 4 and the RSSI of the WiFi access point is less than a predetermined value, it is determined that the terminal device is located in an indoor environment.

The movement track recording method provided in this embodiment of the present invention may be applied to various scenarios. The movement track recording method is typically applied to an outdoor moving scenario in which the terminal device is located. In the following description, an example in which the movement track recording method is applied to an outdoor moving scenario is used for description. It should be noted that the movement track recording method provided in this embodiment of the present invention may also be applied to a scenario such as an indoor moving scenario.

When the movement track recording method is applied to the outdoor moving scenario, the determining a positioning trigger condition according to positioning precision in step 11 may include: determining the positioning trigger condition according to the positioning precision when the terminal device is located in an outdoor moving scenario.

In this embodiment of the present invention, the positioning trigger condition may be the positioning time interval, or may be the geo-fence boundary. The positioning time interval is adjustable when the positioning trigger condition is the positioning time interval, and the geo-fence boundary is also adjustable when the positioning trigger condition is the geo-fence boundary.

Specifically, in an embodiment, when the positioning trigger condition is the positioning time interval, the determining a positioning trigger condition according to positioning precision in step 11 may include:

when the terminal device moves, determining, according to the positioning precision and a current moving speed of the terminal device, a positioning time interval for a next time of positioning. The current moving speed of the terminal device may be sensed by using an accelerometer.

The positioning a terminal device when the positioning trigger condition is met, and recording location information of the terminal device in step 12 may include:

starting timing, positioning the terminal device when the timing reaches the positioning time interval for the next time of positioning, and recording a current location of the terminal device.

Optionally, the determining, according to the positioning precision and a current moving speed of the terminal device, a positioning time interval for a next time of positioning may be specifically:

$T_i = D/V_i$, where $i \geq 1$, i is a positive integer, $T_i$ is a positioning time interval between an $i^{th}$ time of positioning and an $(i+1)^{th}$ time of positioning, D is the positioning precision, and $V_i$ is a moving speed of the terminal device during the $i^{th}$ time of positioning.

To further ensure low power consumption of the terminal device, a time interval threshold $T_0$ may be set in this embodiment of the present invention. $T_i$ and $T_0$ are compared, and a smaller one is selected from $T_i$ and $T_0$ as the positioning time interval, so as to ensure a smaller time interval, and avoid a movement track recording deviation caused by a relatively large $T_i$.

That is, the determining, according to the positioning precision and a current moving speed of the terminal device, a positioning time interval for a next time of positioning may be specifically:

when $T_i \leq T_0$, selecting $T_i$ as the positioning time interval between the $i^{th}$ time of positioning and the $(i+1)^{th}$ time of positioning; or when $T_i > T_0$, selecting T0 as the positioning time interval between the $i^{th}$ time of positioning and the $(i+1)^{th}$ time of positioning.

The time interval threshold $T_0$ may be set according to a requirement.

In this way, a proper value of the positioning time interval between the $i^{th}$ time of positioning and the $(i+1)^{th}$ time of positioning can be ensured, so as to reduce the power consumption of the terminal device.

In this embodiment of the present invention, the positioning time interval is used as the positioning trigger condition, so that the positioning time interval can be changed when the location or a moving speed of the terminal device changes, and the location of the terminal device is obtained once only after the positioning time interval is reached. In this way, an accurate movement track record can be obtained, so that the location record always exists. In addition, the power consumption of the terminal device can be reduced.

In another embodiment, the positioning trigger condition may be the geo-fence boundary. In this embodiment of the present invention, a geo-fence may be defined as a fence that surrounds a designated geographical area, an adjacent area, a parcel delivery route, a school zone, or the like. For example, the geo-fence may be defined by using latitude and longitude coordinates associated with points along a periphery of the geographical area. Optionally, the geo-fence may be defined based on latitude and longitude coordinates of a center and a radius of the geographical area. The geo-fence may be in any shape, including but not limited to a circle, a square, a rectangle, an irregular shape, or the like. In addition, geo-fence areas do not need to be in a same shape or size. The geo-fence may overlap another geo-fence.

In this embodiment of the present invention, when the positioning trigger condition is the geo-fence boundary, an implementation of determining the positioning trigger condition according to the positioning precision may be: setting a geo-fence boundary by using a current location of the terminal device as a center and using the positioning precision as a radius. When the geo-fence boundary is being set, the terminal device may be in the moving state, or may be in the still state. Certainly, within the scope of the present invention, in addition to a circular geo-fence boundary, various shapes of geo-fence boundaries may further be set. For example, a semicircular geo-fence boundary towards a specified direction is set by using the current location as a center and using the positioning precision as a radius, or a square geo-fence boundary is set by using the current location as a center and using a value twice the value of the positioning precision as a side length with reference to the positioning precision.

In this embodiment of the present invention, once the geo-fence boundary is set, geographical coordinates of points on the geo-fence boundary or a location representation manner similar to the geographic coordinates may be stored.

In this embodiment of the present invention, when the positioning trigger condition is the geo-fence boundary, correspondingly, the positioning a terminal device when the positioning trigger condition is met, and recording location information of the terminal device in step 12 may be specifically: positioning the terminal device when the terminal device moves to the geo-fence boundary, and recording a current location of the terminal device. In this embodiment of the present invention, the geo-fence boundary may be a boundary of an area delimitated by a geo-fence. It may be considered that the positioning trigger condition is met when the terminal device moves to the geo-fence boundary or a distance from the terminal device to the geo-fence boundary is less than a specified value. The specified value is a quite small value, such as 1 meter.

In this embodiment, terminal device positioning and movement track recording are triggered once the terminal device moves to a specified geo-fence boundary. A geo-fencing function that the terminal device originally has may be used to check whether the geo-fence boundary is triggered. Alternatively, a current geographical coordinate location of the mobile terminal may be obtained and compared with a geographical coordinate that is of the geo-fence boundary that is stored when the geo-fence boundary is set, to determine whether the terminal device reaches the geo-fence boundary.

Further, the movement track recording manner that is provided in this embodiment of the present invention and that is triggered based on the geo-fence boundary may specifically be as follows: initially obtaining a current location of the terminal device by using any one of the foregoing positioning manners, that is, the initial location, and recording the initial location. The current location may be latitude and longitude information of the terminal device. After the initial location of the terminal device is obtained, a geo-fence boundary, that is, a first geo-fence boundary may be set by using the initial location of the terminal device as a center and using the positioning precision as a radius. When the terminal device moves to the first geo-fence boundary, obtaining of a current location, that is, a second location of the terminal device may be triggered, the second location may be recorded, and a second geo-fence boundary may be set by using the second location as a center and using the positioning precision as a radius. When the terminal device moves to the second geo-fence boundary, obtaining of a current location, that is, a third location of the terminal device may be triggered, the third location may be recorded, and a third geo-fence boundary may be set by using the third location as a center and using the positioning precision as a radius. A subsequent process is deduced by analogy. As the terminal device moves, each time the terminal device reaches a specified geo-fence boundary, a location of the terminal device is obtained and recorded, and a next geo-fence boundary is set.

Depending on a moving direction of the terminal device, two geo-fence boundaries that are sequentially specified in a time sequence may partially overlap or may completely overlap.

It can be learned from the foregoing description that, in this embodiment of the present invention, the geo-fence boundary is used as the positioning trigger condition, so that the geo-fence boundary can be dynamically set when the location of the terminal device changes, and the location of the terminal device is obtained once only when the terminal device reaches the geo-fence boundary. In this way, an accurate movement track record can be obtained, so that the location record always exists. In addition, the power consumption of the terminal device can be reduced.

Figure 2A:
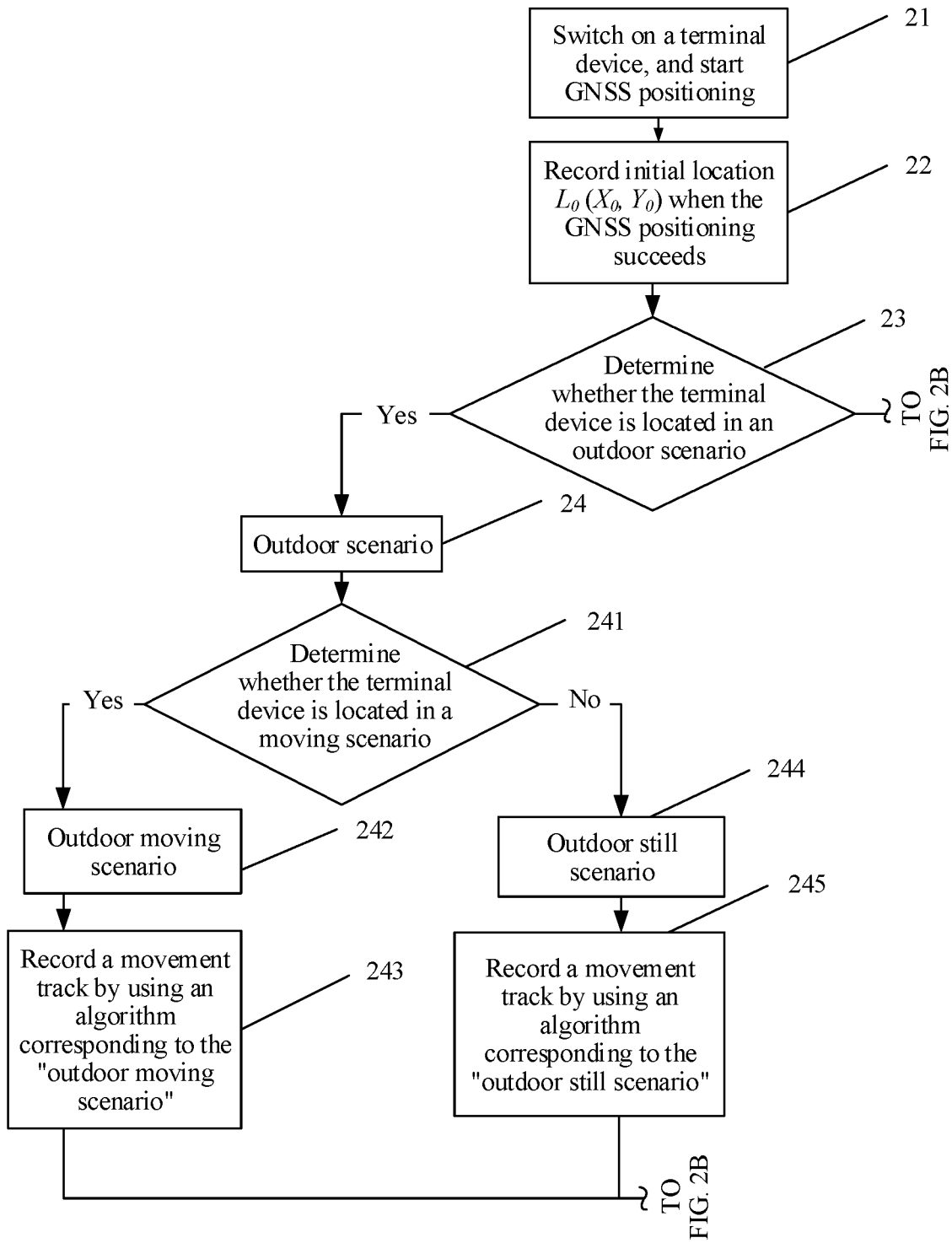
FIG. 2A and FIG. 2B are a flowchart of a movement track recording method according to an embodiment of the present invention.
Figure 2B:
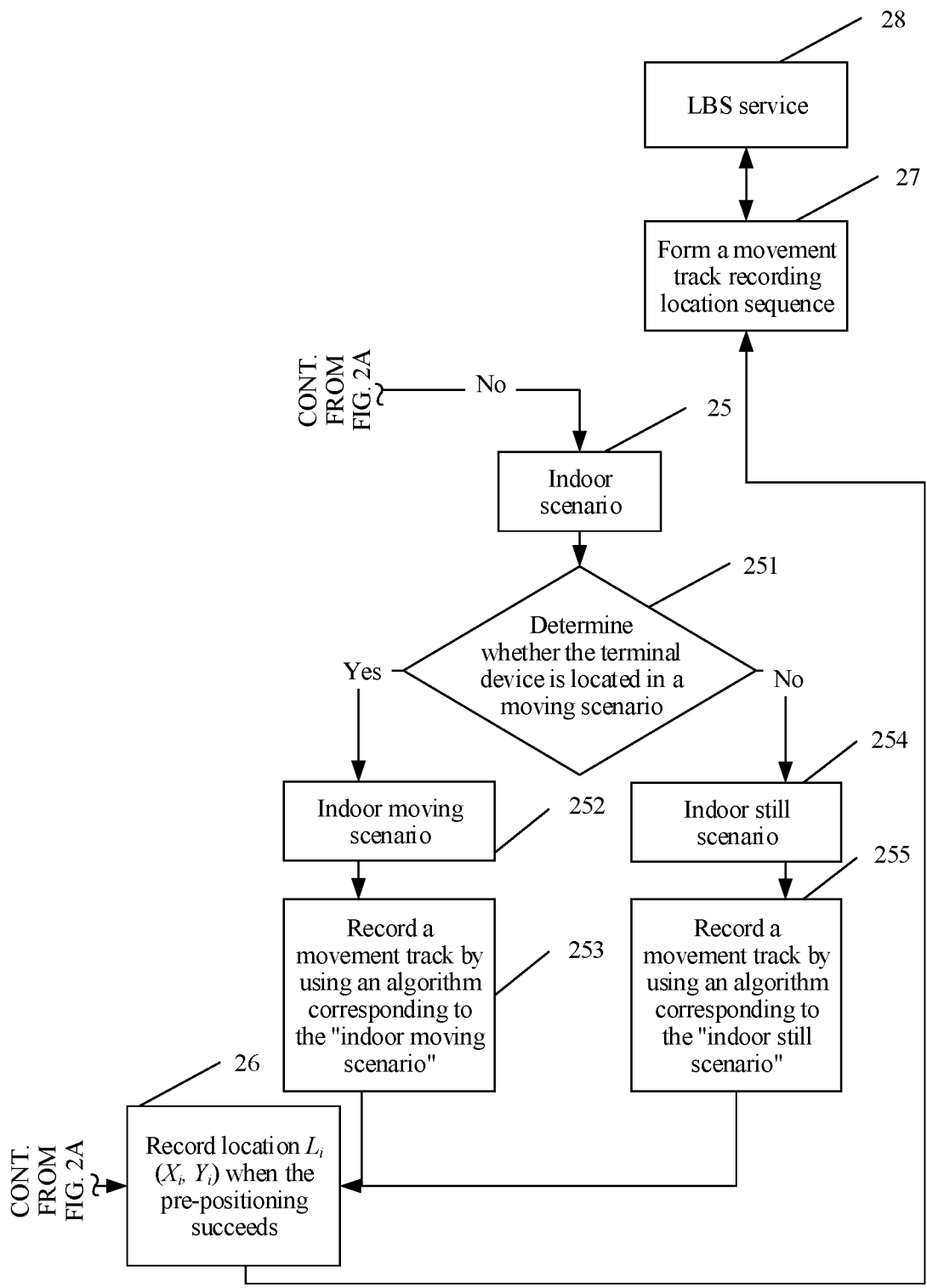

FIG. 2A and FIG. 2B are a flowchart of a movement track recording method according to an embodiment of the present invention. Referring to FIG. 2A and FIG. 2B, the movement track recording method provided in this embodiment of the present invention is performed by a terminal device, and the method may include the following steps.

21. Switch on the terminal device configured to record a movement track, and start GNSS positioning.

22. Record an initial location $L_0$ $(X_0, Y_0)$ of the terminal device when the GNSS positioning succeeds, where the initial location may be represented by using latitude and longitude information, and $L_0$ $(X_0, Y_0)$ represents the initial location of the terminal device during the movement track recording.

23. Determine whether the terminal device is located in an outdoor scenario. If the terminal device is located in the outdoor scenario, step 24 is performed; or if the terminal device is located in an indoor scenario, step 25 is performed.

24. Perform subsequent steps 241 to 245 if it is determined that the terminal device is located in the outdoor scenario.

241. When the terminal device is located in the outdoor scenario, determine whether the terminal device is located in a moving scenario. If the terminal device is located in the moving scenario, go to step 242; or if the terminal device is located in a still scenario, go to step 244.

242. Determine that the terminal device is located in the outdoor moving scenario.

243. Record a movement track by using an algorithm corresponding to the "outdoor moving scenario". The algorithm corresponding to the outdoor moving scenario may be either of the foregoing movement track recording manner that is based on the positioning time interval or the foregoing movement track recording manner that is based on the geo-fence boundary. In the outdoor moving scenario, the location of the terminal device may be determined by means of GPS positioning.

244. Determine that the terminal device is located in an outdoor still scenario.

245. Record a movement track by using an algorithm corresponding to the "outdoor still scenario". The algorithm corresponding to the outdoor still scenario may be the foregoing movement track recording manner that is based on the geo-fence boundary. In this case, because the terminal device is in a still state, the terminal device does not reach a specified geo-fence boundary, and therefore, movement track recording is not triggered. Movement track recording is triggered only when the terminal device is switched to a moving scenario. Certainly, the algorithm corresponding to the outdoor still scenario may be a conventional manner of recording a movement track once every fixed period.

25. Perform subsequent steps 251 to 255 if it is determined that the terminal device is located in an indoor scenario.

251. When the terminal device is located in the indoor scenario, determine whether the terminal device is located in a moving scenario. If the terminal device is located in the moving scenario, go to step 252; or if the terminal device is located in a still scenario, go to step 254.

252. Determine that the terminal device is located in the indoor moving scenario.

253. Record a movement track by using an algorithm corresponding to the "indoor moving scenario". The algorithm corresponding to the indoor moving scenario may be either of the foregoing movement track recording manner that is based on the positioning time interval or the foregoing movement track recording manner that is based on the geo-fence boundary. In the indoor moving scenario, the location of the terminal device may be determined by using the foregoing WiFi positioning or base station positioning.

254. Determine that the terminal device is located in an indoor still scenario.

255. Record a movement track by using an algorithm corresponding to the "indoor still scenario". The algorithm corresponding to the indoor still scenario may be the foregoing movement track recording manner that is based on the geo-fence boundary. In this case, because the terminal device is in a still state, the terminal device does not reach a specified geo-fence boundary, and therefore, movement track recording is not triggered. Movement track recording is triggered only when the terminal device is switched to a moving scenario. Certainly, the algorithm corresponding to the indoor still scenario may be a conventional manner of recording a movement track once every fixed period.

26. Record a current location $L_i$ $(X_i, Y_i)$ of the terminal device when the positioning succeeds in various scenarios, where $L_i$ $(X_i, Y_i)$ may represent a current location of the terminal device during an $i^{th}$ time of movement track recording. That is, steps 23 to 26 are performed each time a movement track needs to be recorded, so as to form the current location of the terminal device during the $i^{th}$ time of movement track recording.

27. Form a movement track recording location sequence. The movement track recording location sequence may be stored by using a queue.

28. Use the movement track recording location sequence for an LBS (location based service, Location based service) service.

It should be noted that the steps shown in FIG. 2A and FIG. 2B are used only to help readers understand the various scenarios of the present invention and the movement track recording manners in the various different scenarios. A person skilled in the art should understand that once the terminal device is switched from one scenario to another scenario, a movement track recording manner in the another scenario after switching may be executed. For example, when the terminal device is located in the outdoor still scenario, the movement track recording manner that is based on the geo-fence boundary or the manner of recording a movement track once every fixed period may be used. However, once a sensor component detects that the terminal device is switched from the outdoor still scenario to the outdoor moving scenario, the movement track recording manner that is based on the geo-fence boundary and that is provided in the embodiments of the present invention or the movement track recording manner that is based on the positioning time interval and that is provided in the embodiments of the present invention is used.

It should be noted that the foregoing description is just an example of the present invention. Within the scope of the present invention, the sequence of the foregoing steps may be adjusted to form another example. For example, it may be first determined whether the terminal device is located in a moving scenario, and it may be then determined whether the terminal device is located in an outdoor scenario.

The movement track recording method provided in this embodiment of the present invention may be applied to the various scenarios, and is preferably applicable to the outdoor moving scenario and the indoor moving scenario. The following uses the outdoor moving scenario as an example to give further explanation.

Figure 3:
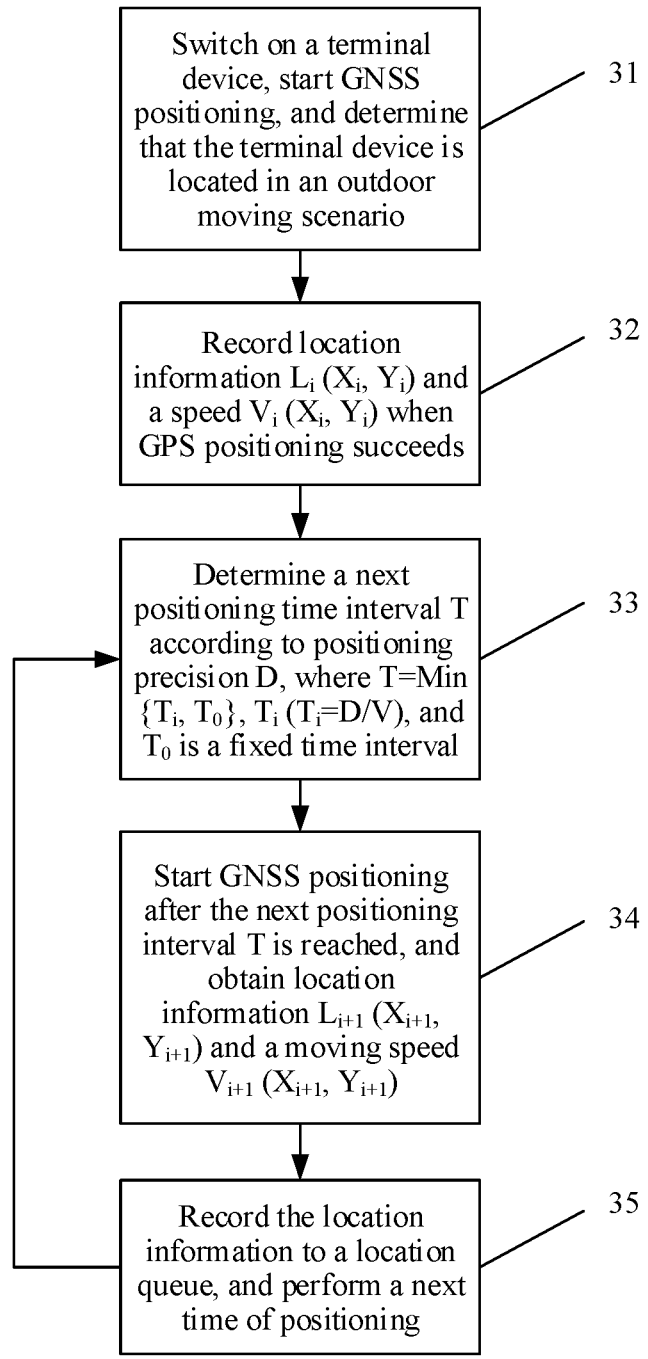
FIG. 3 is a flowchart of a movement track recording method in an outdoor moving scenario according to an embodiment of the present invention.

FIG. 3 is a flowchart of a movement track recording method in an outdoor moving scenario according to an embodiment of the present invention. In FIG. 3, a positioning trigger condition is a positioning time interval. Referring to FIG. 3, the movement track recording method provided in this embodiment of the present invention may include the following steps.

31. Switch on a terminal device, start GNSS positioning, and determine that the terminal device is located in an outdoor moving scenario.

32. Record location information $L_i (X_i, Y_i)$ and a speed $V_i (X_i, Y_i)$ when GPS positioning succeeds, where i is a positive integer, an initial value may be 1, $L_i (X_i, Y_i)$ is current latitude and longitude information, and $V_i (X_i, Y_i)$ is a moving speed of the terminal device during an $i^{th}$ time of positioning.

33. Determine a next positioning time interval T according to positioning precision D, where T=Min $\{T_i, T_0\}$ is selected.

$T_i = D/V_i$, where $T_0$ is a fixed time interval threshold, $T_i$ is a positioning time interval between the $i^{th}$ time of positioning and an $(i+1)^{th}$ time of positioning, D is the positioning precision, and $V_i$ is the moving speed of the terminal device during the $i^{th}$ time of positioning.

34. Start GNSS positioning after the next positioning interval T is reached, and obtain location information $L_{i+1} (X_{i+1}, Y_{i+1})$ and a moving speed $V_{i+1} (X_{i+1}, Y_{i+1})$.

35. Record the location information to a location queue, and perform a next time of positioning.

During the next time of positioning, go back to step 33. Steps 33 to 35 are repeatedly performed until a user instructs to end the movement track recording.

In this embodiment of the present invention, the positioning time interval is used as the positioning trigger condition, so that the positioning time interval can be changed when a location or a moving speed of the terminal device changes, and the location of the terminal device is obtained once only after the positioning time interval is reached. In this way, an accurate movement track record can be obtained, so that the location record always exists. In addition, power consumption of the terminal device can be reduced.

Figure 4:
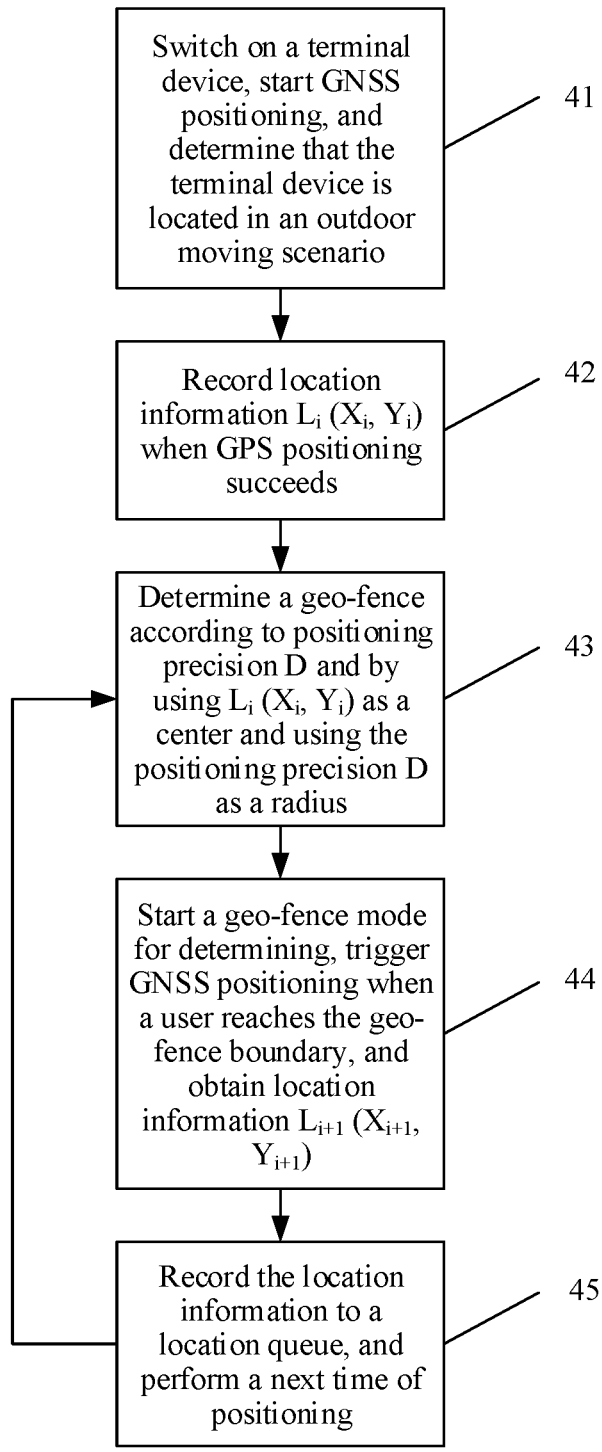
FIG. 4 is a flowchart of another movement track recording method in an outdoor moving scenario according to an embodiment of the present invention.

FIG. 4 is a flowchart of a movement track recording method in an outdoor moving scenario according to an embodiment of the present invention. In FIG. 4, a positioning trigger condition is a geo-fence boundary. Referring to FIG. 4, the movement track recording method provided in this embodiment of the present invention may include the following steps:

41. Switch on a terminal device, start GNSS positioning, and determine that the terminal device is located in an outdoor moving scenario.

42. Record location information $L_i (X_i, Y_i)$ when GPS positioning succeeds, where i is a positive integer, an initial value may be 1, and $L_i (X_i, Y_i)$ is current latitude and longitude information.

43. Determine a geo-fence boundary according to positioning precision D and by using $L_i (X_i, Y_i)$ as a center and using the positioning precision D as a radius.

44. Start a geo-fence mode for determining, trigger GNSS positioning when a user reaches the geo-fence boundary, and obtain location information $L_{i+1} (X_{i+1}, Y_{i+1})$.

45. Record the location information to a location queue, and perform a next time of positioning.

During the next time of positioning, go back to step 43. Steps 43 to 45 are repeatedly performed until a user instructs to end the movement track recording.

In this embodiment of the present invention, the geo-fence boundary is used as the positioning trigger condition, so that the geo-fence boundary can be dynamically set when a location of the terminal device changes, and the location of the terminal device is obtained once only when the terminal device reaches the geo-fence boundary. In this way, an accurate movement track record can be obtained, so that the location record always exists. In addition, power consumption of the terminal device can be reduced.

Based on a same concept, an embodiment of the present invention further provides a terminal device. As shown in FIG. 1A, the terminal device provided in this embodiment may implement the procedures in the embodiments shown in FIG. 1B, FIG. 2A and FIG. 2B, FIG. 3, and FIG. 4 in the present invention. The terminal device includes a processor 120 and a positioning component 150.

The processor 120 is configured to determine a positioning trigger condition according to positioning precision. The positioning trigger condition is not fixed.

The positioning component 150 is configured to position the terminal when the positioning trigger condition is met.

The processor 120 is further configured to record a location of the terminal.

Optionally, the processor 120 is specifically configured to:
  determine the positioning trigger condition according to the positioning precision when the terminal is located in an outdoor moving scenario or in an indoor moving scenario.

Optionally, before determining the positioning trigger condition according to the positioning precision, the processor 150 is further configured to:
  determine a movement status and a location environment of the terminal, where the movement status includes a still state and a moving state, and the location environment includes an indoor environment and an outdoor environment.

Optionally, the positioning trigger condition is a positioning time interval, and the positioning time interval is dynamically adjustable.

Optionally, the processor 120 is specifically configured to:
when the terminal moves, determine, according to the positioning precision and a current moving speed of the terminal, a positioning time interval for a next time of positioning.

The positioning component 150 is specifically configured to position the terminal when timing reaches the positioning time interval for the next time of positioning.

The processor 120 is specifically configured to record a current location of the terminal.

Optionally, the processor is specifically configured to:
determine that a positioning time interval between an $i^{th}$ time of positioning and an $(i+1)^{th}$ time of positioning is $T_i=D/V_i$, where
$i \geq 1$, i is a positive integer, $T_i$ is the positioning time interval between the $i^{th}$ time of positioning and the $(i+1)^{th}$ time of positioning, D is the positioning precision, and $V_i$ is a moving speed of the terminal during the $i^{th}$ time of positioning.

Optionally, the processor 120 is further configured to set a time interval threshold $T_0$; and
when $T_i \leq T_0$, select $T_i$ as the positioning time interval between the $i^{th}$ time of positioning and the $(i+1)^{th}$ time of positioning; or
when $T_i > T_0$, select $T_0$ as the positioning time interval between the $i^{th}$ time of positioning and the $(i+1)^{th}$ time of positioning.

Optionally, the positioning trigger condition is a geo-fence boundary, and the geo-fence boundary is dynamically adjustable.

Optionally, the processor 120 is specifically configured to:
set, by using a current location of the terminal as a center and using the positioning precision as a radius, a geo-fence boundary for a next time of positioning.

The positioning component 150 is configured to position the terminal once the terminal moves to the geo-fence boundary.

The processor 120 is specifically configured to record a current location of the terminal.

Optionally, before determining the positioning trigger condition according to the positioning precision, the processor 120 is further configured to:
record an initial location of the terminal device.

According to the terminal device provided in this embodiment of the present invention, the terminal device is positioned when the positioning trigger condition is met, and the location of the terminal device is recorded. The positioning precision is considered when the positioning trigger condition is being determined, so that precision in recording a movement track of the terminal device cannot be affected. In addition, the variable positioning trigger condition instead of a relatively small fixed period is used as the terminal device positioning condition, so that power consumption of the terminal device can be reduced.

Optionally, an embodiment of the present invention further provides a movement track recording apparatus. The apparatus includes a memory and a processor, and the memory stores a computer instruction. When executing the computer instruction, the processor executes the movement track recording method provided in the embodiments of the present invention. The movement track recording apparatus may be the foregoing terminal device.

Optionally, an embodiment of the present invention further provides a non-temporary storage medium. The non-temporary storage medium is configured to store a program designed for the movement track recording apparatus to execute the foregoing method. The program includes the computer software instruction used by the foregoing movement track recording apparatus.

It should be noted that for the foregoing movement track recording apparatus provided in the foregoing embodiment, only the division of the foregoing function modules is used as an example for description. In actual application, the foregoing functions can be allocated according to a requirement to different function modules for implementation, that is, an inner structure of the apparatus is divided into different function modules to implement all or some of the foregoing functions. In addition, the movement track recording apparatus provided in the foregoing embodiment and the movement track recording method pertain to the same concept. For a specific implementation process, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely examples of embodiments of the present invention, but are not intended to limit the present invention. Any modification, equivalent replacement, and improvement made within the scope of the present invention shall fall within the protection scope of the present invention.

What is claimed is:

1. A movement track recording method, the method comprising:
determining a positioning trigger condition according to a positioning precision, wherein the positioning trigger condition comprises a positioning time interval, and the positioning time interval is dynamically adjustable, and wherein determining the positioning trigger condition comprises calculating, using the positioning precision and a current moving speed of the terminal device, a positioning time interval for a next time of positioning when the terminal device moves; and
positioning a terminal device when the positioning trigger condition is met, and recording a location of the terminal device.

2. The method of claim 1, wherein determining the positioning trigger condition comprises determining the positioning trigger condition according to the positioning precision when the terminal device is located in an outdoor moving scenario or in an indoor moving scenario.

3. The method of claim 1, wherein positioning the terminal device and recording the location of the terminal device comprises:
starting a timing;
positioning the terminal device when the timing reaches the positioning time interval for the next time of positioning; and
recording a current location of the terminal device.

4. The method of claim 3, wherein calculating the positioning time interval for the next time of the positioning is performed in accordance with an equation:

$$T_i=D/Vi,$$

the $i \geq 1$, the i is a positive integer, the $T_i$ is a positioning time interval between an $i^{th}$ time of positioning and an $(i+1)^{th}$ time of positioning, the D is the positioning precision, and the $V_i$ is a moving speed of the terminal device during the $i^{th}$ time of positioning.

5. The method of claim 4, further comprising setting a time interval threshold ($T_0$), wherein the determining the positioning time interval for the next time of positioning comprises:
selecting the $T_i$ as the positioning time interval between the $i^{th}$ time of positioning and the $(i+1)^{th}$ time of positioning when $T_i \leq T_0$; and
selecting the $T_0$ as the positioning time interval between the $i^{th}$ time of positioning and the $(i+1)^{th}$ time of positioning when $T_i > T_0$.

6. The method of claim 1, wherein the positioning trigger condition comprises a geo-fence boundary, and the geo-fence boundary is dynamically adjustable.

7. The method of claim 6, wherein determining the positioning trigger condition comprises setting a geo-fence boundary for a next time of positioning using a current location of the terminal device as a center and the positioning precision as a radius, and positioning the terminal device and recording the location of the terminal device comprises:
positioning the terminal device when the terminal device moves to the geo-fence boundary for the next time of positioning; and
recording the current location of the terminal device.

8. The method of claim 1, wherein before determining the positioning trigger condition, the method further comprises recording an initial location of the terminal device.

9. The method of claim 1, wherein before determining the positioning trigger condition, the method further comprises determining a movement status and a location environment of the terminal device, the movement status comprising a still state and a moving state, and the location environment comprising an indoor environment and an outdoor environment.

10. A terminal device, comprising:
a memory comprising instructions; and
a processor coupled to the memory, the instructions causing the processor to be configured to:
determine a positioning trigger condition according to a positioning precision; wherein the positioning trigger condition comprises a positioning time interval, and the positioning time interval is dynamically adjustable, and wherein determining the positioning trigger condition comprises calculating, using the positioning precision and a current moving speed of the terminal device, a positioning time interval for a next time of positioning when the terminal device moves;
position the terminal device when the positioning trigger condition is met; and
record a location of the terminal device.

11. The terminal device of claim 10, wherein in a manner of determining the positioning trigger condition, the instructions further cause the processor to be configured to determine the positioning trigger condition according to the positioning precision when the terminal device is located in an outdoor moving scenario or in an indoor moving scenario.

12. The terminal device of claim 10, wherein in a manner of determining the positioning trigger condition, the instructions further cause the processor to be configured to:
position the terminal device when timing reaches the positioning time interval for the next time of positioning; and
record a current location of the terminal device.

13. The terminal device of claim 12, wherein in a manner of calculating the positioning time interval for the next time of positioning, the instructions further cause the processor to be configured to:
determine a positioning time interval between an $i^{th}$ time of positioning and an $(i+1)^{th}$ time of positioning in accordance to $T_i = D/V_i$,
wherein the $i \geq 1$, the i is a positive integer, the $T_i$ is the positioning time interval between the $i^{th}$ time of positioning and the $(i+1)^{th}$ time of positioning, the D is the positioning precision, and the $V_i$ is a moving speed of the terminal device during the $i^{th}$ time of positioning.

14. The terminal device of claim 13, wherein the instructions further cause the processor to be configured to:
set a time interval threshold ($T_0$);
select the $T_i$ as the positioning time interval between the $i^{th}$ time of positioning and the $(i+1)^{th}$ time of positioning when $T_i \leq T_0$; and
select the $T_0$ as the positioning time interval between the $i^{th}$ time of positioning and the $(i+1)^{th}$ time of positioning when $T_i > T_0$.

15. The terminal device of claim 10, wherein the positioning trigger condition comprises a geo-fence boundary, and the geo-fence boundary is dynamically adjustable.

16. The terminal device of claim 15, wherein the instructions further cause the processor to be configured to:
set a geo-fence boundary for a next time of positioning using a current location of the terminal device as a center and the positioning precision as a radius;
position the terminal device when the terminal device moves to the geo-fence boundary for the next time of positioning; and
record the current location of the terminal device.

17. The terminal device of claim 10, wherein the instructions further cause the processor to be configured to record an initial location of the terminal device.

18. The terminal device of claim 10, wherein the instructions further cause the processor to be configured to determine a movement status and a location environment of the terminal device, the movement status comprising a still state and a moving state, and the location environment comprising an indoor environment and an outdoor environment.

* * * * *